United States Patent [19]

Dempsey

[11] Patent Number: 4,896,411
[45] Date of Patent: Jan. 30, 1990

[54] METHOD OF MAKING A MULTIPLE CELL CONDENSING HEAT EXCHANGER

[75] Inventor: Daniel J. Dempsey, Indianapolis, Ind.
[73] Assignee: Carrier Corporation, Syracuse, N.Y.
[21] Appl. No.: 881,989
[22] Filed: Jul. 3, 1986

Related U.S. Application Data

[62] Division of Ser. No. 729,765, May 2, 1985, abandoned.

[51] Int. Cl.$^4$ .............................................. B21D 53/02
[52] U.S. Cl. .......................... 29/157.3 D; 29/157.3 R
[58] Field of Search ................... 29/157.3 D, 157.3 R, 29/463; 126/117, 99 R, 117, 110 R, 99 A, 99 C

[56] References Cited

U.S. PATENT DOCUMENTS 3,757,856  9/1973  Kun ................................ 29/157.3 D
4,298,061  11/1981  Hoeffken ....................... 29/157.3 D

FOREIGN PATENT DOCUMENTS 490338  2/1953  Canada ........................... 29/157.3 D Primary Examiner—Howard N. Goldberg
Assistant Examiner—Irene Cuda
Attorney, Agent, or Firm—Dana F. Bigelow

[57] ABSTRACT

A gas fired condensing furnace comprising a multiple cell condensing heat exchanger is provided wherein each condensing heat exchanger cell has a condensing flow passage of serpentine shape formed from a single flat sheet metal blank. The condensing heat exchanger cell is formed to be compact in size and to minimize heating fluid side pressure drop therethrough. The condensing flow passage for each condensing heat exchanger cell provides high velocity fluid flow therethrough for increasing its heat transfer characteristics.

4 Claims, 7 Drawing Sheets

METHOD OF MAKING A MULTIPLE CELL CONDENSING HEAT EXCHANGER

This application is a division of application Ser. No. 729,765, filed May 2, 1985, now abandoned.

BACKGROUND OF THE INVENTION

The present invention relates to condensing furnaces, and more particularly to a condensing heat exchanger in a gas fired condensing furnace for transferring sensible and latent heat energy from a heating fluid to a flow of air to be heated.

Due to the cost and shortage of natural gas, attempts have been made to design and construct more efficient gas fired hot air furnaces. One successful method in maximizing the heat energy transferred from a heating fluid to air to be heated is to transfer as much latent heat as possible from the water vapor in the heating fluid to the air. Thus, increases in furnace heating efficiency have been accomplished by purposely lowering the heating fluid's temperature and condensing as much of the water vapor as possible to transfer its latent heat to the air. This is generally accomplished by including a condensing heat exchanger with the primary heat exchanger and passing cool air to be heated initially over the condensing heat exchanger. In these types of condensing furnaces, furnace heating efficiencies of 90% or more are not uncommon.

In general, most of these condensing heat exchangers take the form of a shell and tube, fin tube, or plate fin arrangement for further reducing the temperature of the heating fluid. Although these arrangements have been somewhat successful, due to their structure and material requirements they are relatively costly to produce and generally result in too large of a pressure drop of the fluid flowing thereacross. One method of overcoming the large pressure drop is to provide a larger cabinet within which the furnace assembly is enclosed or to provide a blower of increased capacity. However, either one of these two solutions serve only to increase further the size and cost of the condensing furnace.

Further, arrangement within prior art condensing furnaces of the burner device, primary heat exchanger, condensing heat exchanger, and blower are such that additional piping is usually necessary to deliver the flow of heating fluid from the primary heat exchanger to the condensing heat exchanger so that condensate formed therein does not flow to the burner device or blower assembly. Since the condensate is generally acidic, its corrosive effects on the burner device or blower assembly would be highly undesirable.

In reference to the design of primary heat exchangers, one design is known as the clamshell type since it is constructed from two separate sheets, usually of metal, each of which has the design stamped therein and are then secured together to form the heat exchanger. Although using two separate sheets has been generally satisfactory in producing the primary heat exchanger, which would handle only gaseous flue products, its use in manufacturing a condensing heat exchanger is not as desirable since the liquid condensate tends to leak therefrom.

SUMMARY OF THE INVENTION

It is an object of the present invention is to provide a method of manufacturing a condensing heat exchanger from a relatively small amount of material, such as a single sheet of flat metal.

Other objects will be apparent from the description to follow and from the appended claims.

The preceding objects are achieved according to one embodiment of the present invention by the provision of a condensing furnace for heating air being circulated therethrough. The condensing furnace comprises a burner device for supplying a heating fluid, and a primary heat exchanger disposed generally below the burner device and having a primary flow passage leading downwardly therefrom for delivering the heating fluid therethrough. Disposed generally below the primary heat exchanger and in fluid communication therewith is a condensing heat exchanger having a condensing flow passage leading downwardly from the primary heat exchanger for delivering the heating fluid and condensate downwardly therethrough. An induced draft device is generally disposed below the condensing heat exchanger and near its outlet for drawing the heating fluid downwardly through the flow passages of the respective heat exchangers. Air to be heated is circulated upwardly in a counterflow direction relative to the downwardly flowing heating fluid by a blower device that is located generally below the condensing heat exchanger.

In accordance with another embodiment of the present invention there is provided an improved condensing heat exchanger in a condensing furnace and which is disposed generally vertically between a primary heat exchanger and a blower device, wherein the primary heat exchanger is located generally above the blower device. The condensing heat exchanger has a condensing flow passage leading downwardly from the primary heat exchanger, and sections of the condensing flow passage are generally perpendicularly disposed to the flow of air to be heated circulated by the blower device.

In accordance with yet another embodiment of the present invention, there is provided a method of manufacturing a condensing heat exchanger comprising the steps of providing a single flat sheet metal blank, designing a prefolded high velocity flow passage pattern having selected dimensions and shape, and forming the designed prefolded high velocity flow passage pattern into a section of the flat sheet metal blank. Thereafter, the steps further include folding the flat sheet metal blank so that a portion of the formed section registers with the remaining portion of the formed section to form a high velocity flow passage having an inlet portion and an outlet portion, and then sealing selected edge portions of the folded sheet metal blank.

BRIEF DESCRIPTION OF THE DRAWINGS

The above mentioned and other features and objects of this invention, and the manner of obtaining them, will become more apparent and the invention itself will be better understood by reference to the following description of an embodiment of the invention taken in conjunction with the accompanying drawings, wherein.

DESCRIPTION OF A PREFERRED EMBODIMENT

Figure 1:
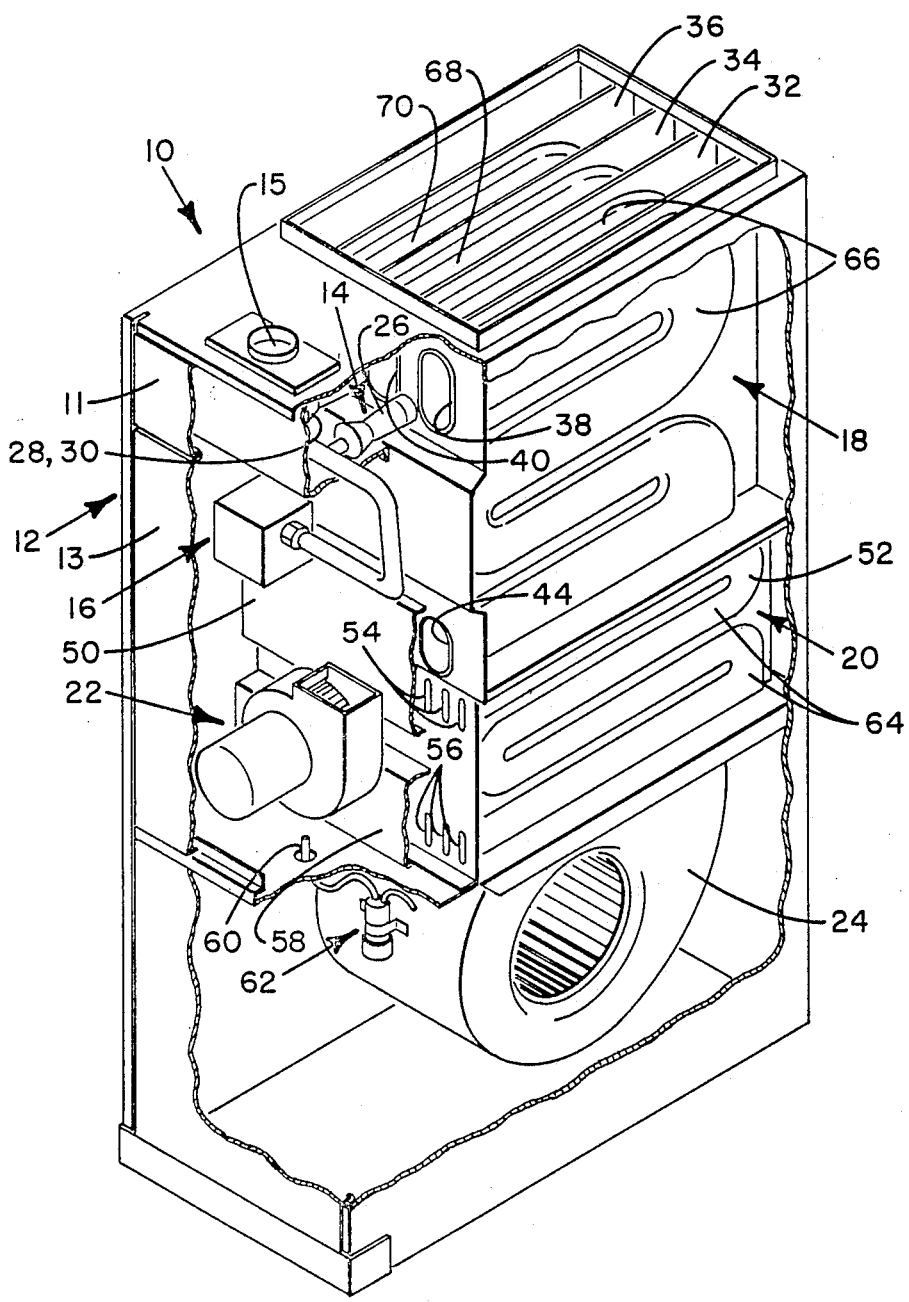
FIG. 1 is a partially broken away perspective view of a preferred embodiment of the present invention.

Referring to FIG. 1, condensing furnace 10 includes in major part steel cabinet 12 housing therein burner assembly 14, gas control assembly 16, primary heat exchanger assembly 18, condensiong heat exchanger assembly 20, induced draft motor assembly 22, and circulating air blower 24. Important to the present invention, and which will be discussed in greater detail below, is the vertical arrangement of the above major assemblies, and particularly condensing heat exchanger assembly 20 relative to primary heat exchanger assembly 18 and circulating air blower 24.

Figure 2:
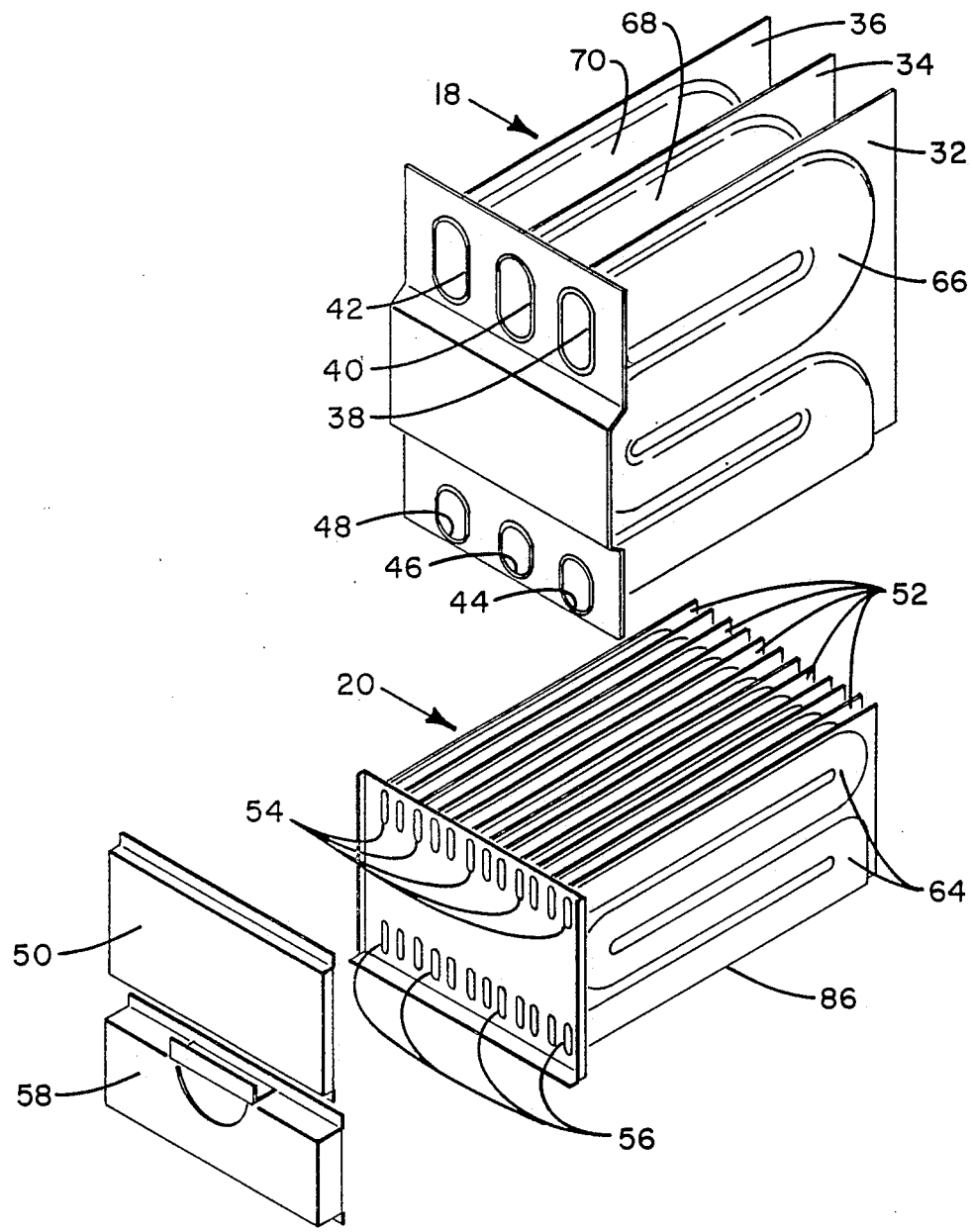
FIG. 2 is an exploded view of the primary and condensing heat exchanger assemblies in FIG. 1.

Burner assembly 14 includes three inshot burners 26, 28, 30, wherein only burners 28 and 30 are illustrated, for respective primary heat exchanger cells 32, 34, 36. Burners 26–30 receive fuel gas from gas control assembly 16 and inject the fuel gas into respective primary heat exchanger inlets 38, 40, 42 (FIGS. 1 and 2). A part of the injection process includes drawing air through combustion air inlet 15 into primary heat exchanger assembly 18 so that the fuel gas and air mixture may be combusted therein. Although only three inshot burners 26–30 are illustrated in conjunction with three primary heat exchanger cells 32–36, it should be understood that a fewer or greater number of burners or primary heat exchanger cells can be used.

Each primary heat exchanger cell 32–36 winds in a S-shaped or serpentine manner to respective primary heat exchanger outlets 44, 46, 48 opening into and in fluid communication with transition chamber 50.

Also connected to transition chamber 50 and in fluid communication therewith is condensing heat exchanger assembly 20 including twelve identical condensing heat exchanger cells 52. Each condensing heat exchanger cell 52 includes a respective condensing heat exchanger inlet 54 opening into transition chamber 50 and a condensing heat exchanger outlet 56 opening into condensate collector 58. Respective condenser heat exchanger outlets 56 deliver exhaust heating fluid and condensate to condensate collector 58. As can be seen, and which will be described in greater detail below, each condensing heat exchanger cell 52 winds downwardly from primary heat exchanger assembly 18 in a S-shaped or serpentine manner, and for each primary heat exchanger cell 32–36, there are four condensing heat exchanger cells 52.

Induced draft motor assembly 22 includes a motor with an inducer wheel (not shown) for drawing the heating fluid created by burner assembly 14 through primary heat exchanger assembly 18 and condensing heat exchanger assembly 20. Circulating air blower 24 delivers air to be heated upwardly in a counterflow direction relative to the downward flow of heating fluid through condensing heat exchanger assembly 20 and primary heat exchanger 18, whereby the cool air passing over condensing heat exchanger assembly 20 lowers the wall temperature thereof below the flue gas or heating fluid dew point to cause a portion of the water vapor to condense, thereby recovering a portion of sensible and latent heat energy. The condensate formed within each individual condensing heat exchanger cell 52 flows through condensate collector 58 into condensate drain tube 60 to condensate drain trap 62. As blower 24 continues to urge a flow of air to be heated upwardly through condensing heat exchanger assembly 20 and primary heat exchanger assembly 18, heat energy is transferred from the heating fluid flowing through twelve identical condensing flow passages 64 in respective condensing heat exchanger cells 52 and three identical primary flow passages 66, 68, 70 of respective primary heat exchanger cells 32, 34, 36 to the air.

Figure 9:
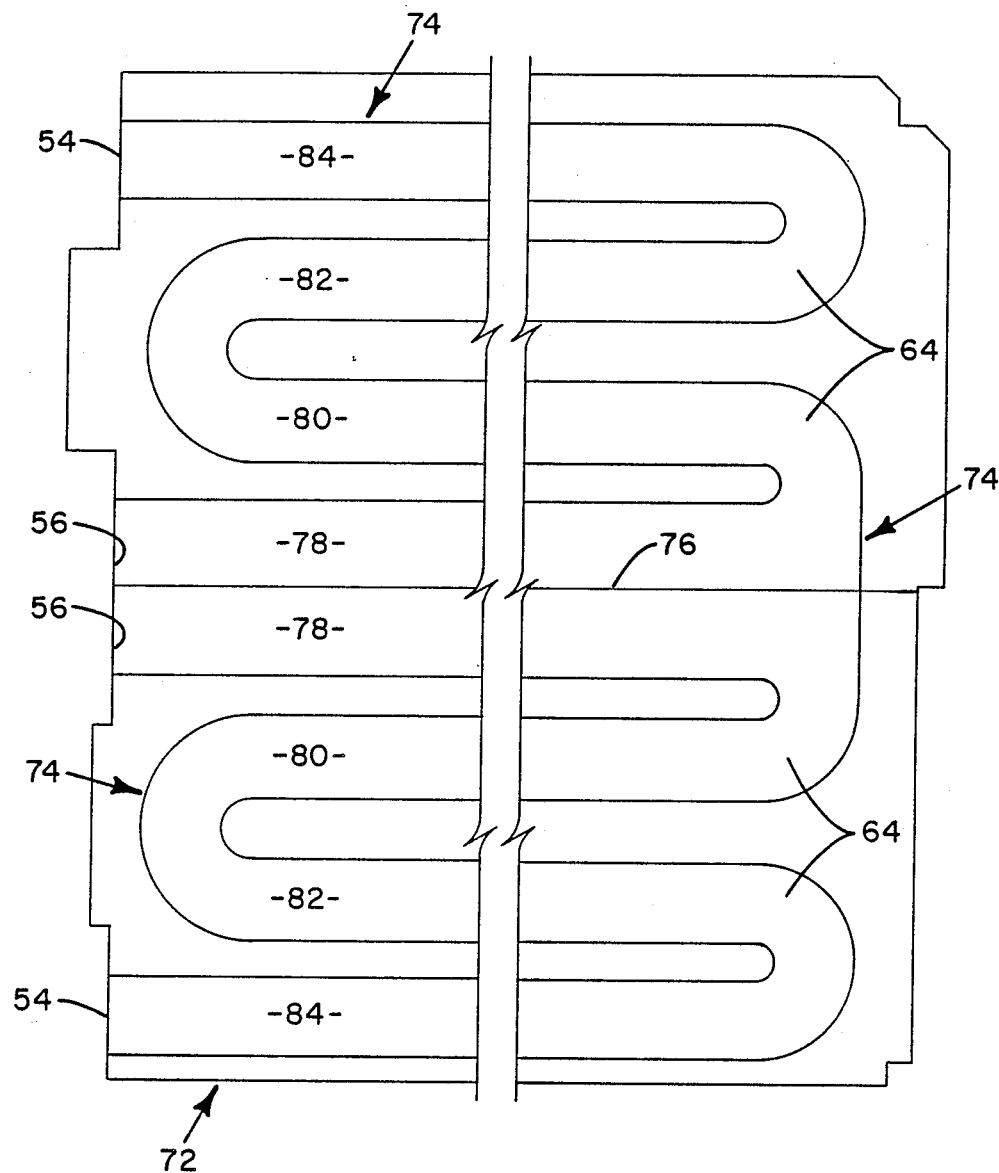
FIG. 9 is a top plan view of a single flat sheet metal blank having formed therein a prefolded high velocity flow passage pattern.

Referring now primarily to FIGS. 3–6, 9, a description of the method of manufacturing a condensing heat exchanger cell 52 will be described. One of the important features of the present invention is the manufacturing of a single condensing heat exchanger cell 52 from a single, rather than two, flat sheet metal blank 72 (FIG. 9). The flat sheet metal blank 72 is preferably made of stainless steel or other material resistant to the corrosive effects of the acidic condensate formed in the condensing heat exchanger cell 52. The method of manufacturing a condensing heat exchanger cell 52 includes designing a flow passage pattern having high velocity characteristics appropriate to the desired heat transfer requirements. The present invention provides a prefolded high velocity flow passage pattern 74 (FIG. 9), wherein the term prefolded refers to an open-face pattern that must be folded together to produce the intended or designed product. Pattern 74 is of S-shape or serpentine design which will ultimately result in a four-pass counterflow passage, such as condensing flow passage 64. Pattern 74 is further designed with required dimensions, such as width and depth, that will result in the cross-sectional shape of condensing flow passage 64 minimizing the heating fluid pressure drop therethrough, providing unrestricted flow of condensate, and preventing the clogging thereof by dust and dirt.

As illustrated in FIG. 9, prefolded high velocity flow passage pattern 74 has been formed, such as by stamping, into single flat sheet metal blank 72, thereby resulting in the formation of condensing flow passage 64 having inlet 54 and outlet 56. As illustrated, fold line 76 is disposed generally along the longitudinal center line of the formed or stamped portion of outlet 56, so that upon folding sheet metal blank 72 at fold line 76, condensing heat exchanger cell 52 is formed such that the last section 78 of flow passage 64 is seamless, as at 86 and illustrated more clearly in FIG. 5, thereby preventing leakage of condensate from heat exchanger cell 52.

Figure 3:
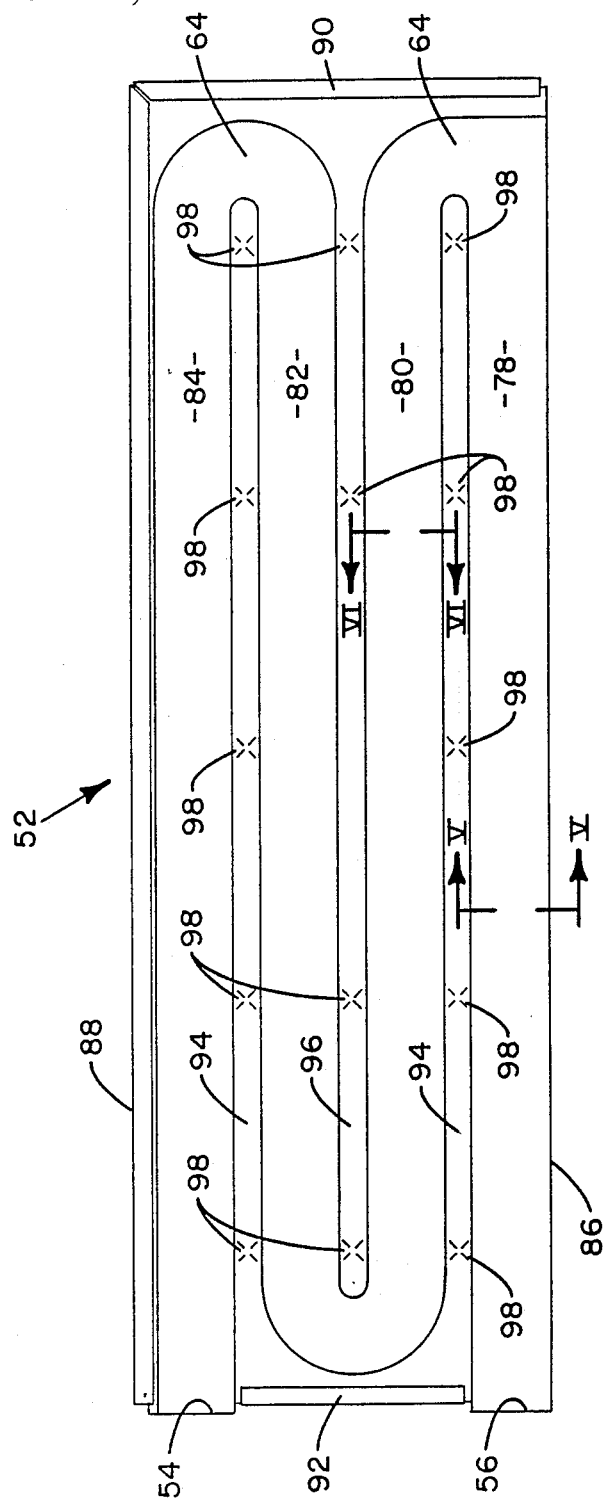
FIG. 3 is a side elevational view of a single condensing heat exchanger cell used in the assembly of FIG. 2.
Figure 4:
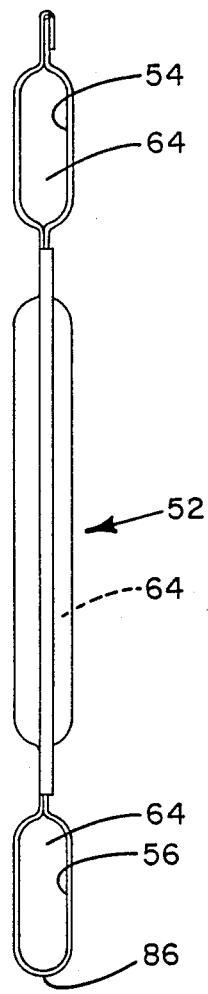
FIG. 4 is an end elevational view of the heat exchanger cell of FIG. 3.

After sheet metal blank 72 has been folded at fold line 76, condensing heat exchanger cell 52 generally appears as illustrated in FIG. 3. As illustrated, condensing flow passage 64 is of S or serpentine shape having, in this particular embodiment, four sections 78, 80, 82, 84 that will be oriented generally transverse to the flow direction of air to be heated circulated upwardly by air blower 24. Condensing heat exchanger cell 52 is termed a "four-pass counterflow" heat exchanger since the heating fluid, in its downward direction of travel, passes transversely four times across the upward flow of air to be heated.

Figure 5:
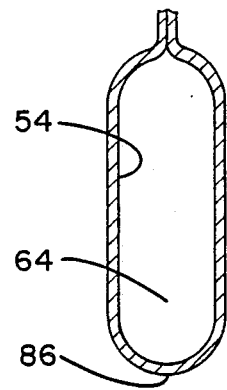
FIG. 5 is a sectional view of FIG. 3 taken along line V—V and viewed in the direction of the arrows.
Figure 6:
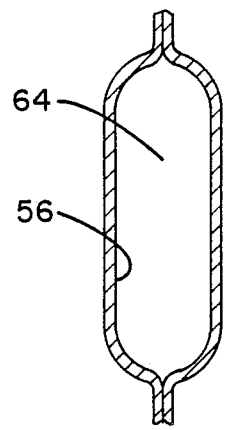
FIG. 6 is a sectional view of FIG. 3 taken along line VI—VI and viewed in the direction of the arrows.

By appropriately designing the dimensions and shape of flow passage pattern 74, the cross-sectional geometry of condensing flow passage 64, as illustrated in FIGS. 5 and 6, minimizes the heating fluid side pressure drop thereacross and substantially maintains that minimal pressure drop at a constant value throughout various gas input rates. Thus, use of a smaller capacity, and hence smaller size, induced draft motor in motor assembly 22 is possible. Since providing a compact condensing furnace 10 is an objective of the present invention, the smaller size induced draft motor is highly desirable.

Another important feature of the present invention is its provision of a condensing heat exchanger cell 52 having a minimum dimension in height when installed within condensing furnace 10. In the present disclosure, the invention provides a condensing heat exchanger cell 52 having a height of about six inches, which further serves to provide a compact condensing furnace 10, which is generally, no taller than a conventional non-condensing furnace.

Final processing or preparation of condensing heat exchange cell 52 produced from sheet metal blank 72 includes crimping the formed cell 52 at edge 88 (FIG. 3) along the length thereof, edge 90 along the length thereof and edge 92 between inlet 54 and outlet 56. In addition, condensing heat exchanger cell 52 has a U-shaped abutting section 94 and abutting section 96 formed between the serpentine condensing flow passage 64 and which are secured together after folding, such as by spot welding at points 98.

Assembly of condensing heat exchanger assembly 20 comprises securing, in this particular embodiment, twelve condensing heat exchangers 52 to cell mounting panel 100. Cell mounting panel 100 has a like plurality of inlets 102 communicating with respective condensing heat exchanger inlets 54 and outlets 104 communicating with respective heat exchanger outlets 56. Of course, inlets 102 communicate with transition chamber 50, and outlets 104 communicate with condensate collector 58, previously described above.

Figure 7:
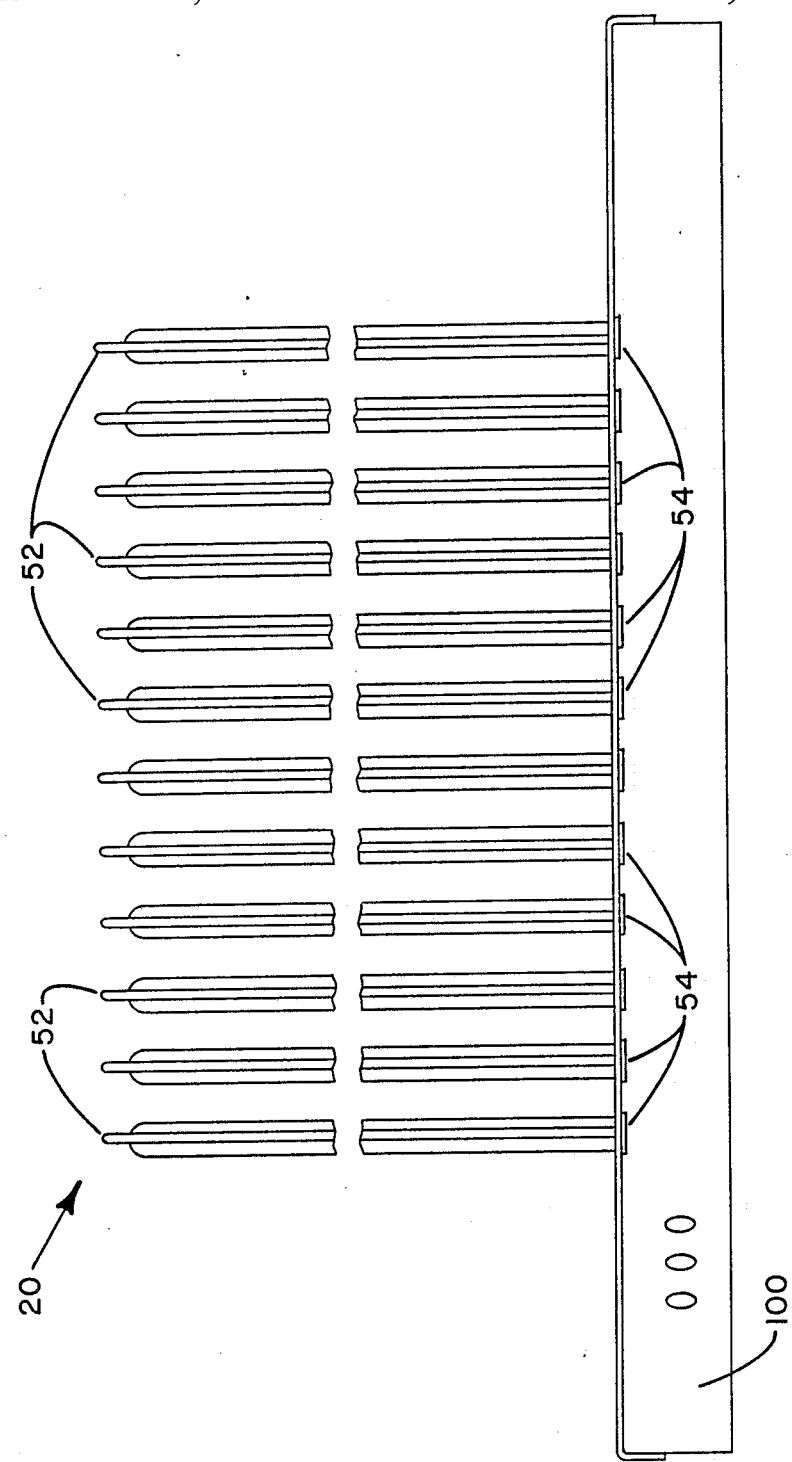
FIG. 7 is a fragmentary top plan view of the condensing heat exchanger assembly mounted on a panel.
Figure 8:
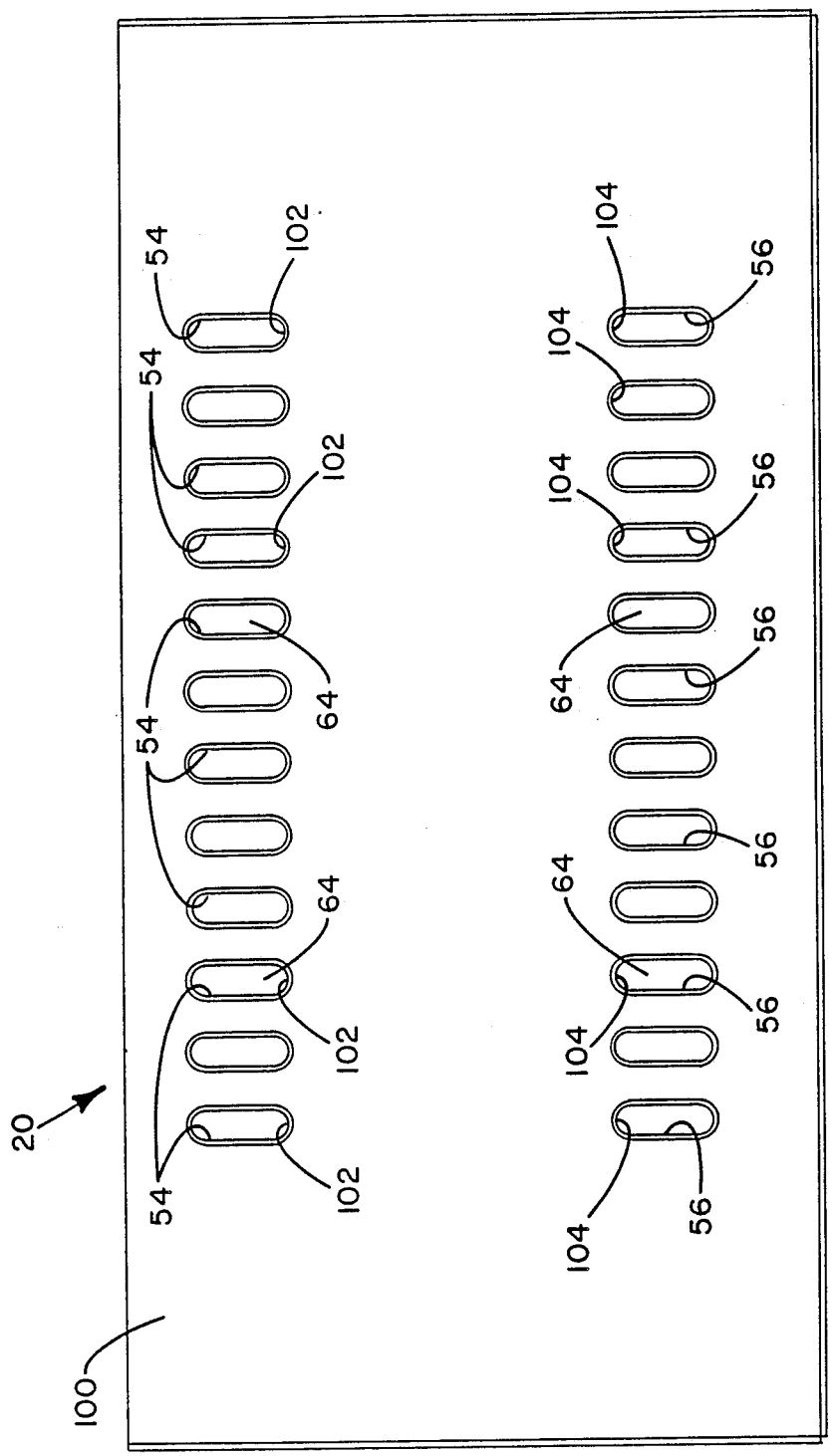
FIG. 8 is a front elevational view of the assembly in FIG. 7.

As clearly illustrated in FIGS. 7 and 8, each condensing heat exchanger cell 52 is spaced apart from adjacent ones of cells 52, and such spaced apart distance is predetermined so as to minimize circulating air pressure drop thereacross, and to hold substantially constant that pressure drop throughout various ranges of gas input rates. This results in minimizing the circulating air pressure drop, thereby permitting use of a smaller capacity, and hence smaller size, circulating air blower 24, which further enhances the compactness of condensing furnace 10. Further, this also provides unrestricted flow of air and prevents clogging due to dust and dirt.

Referring now primarily to FIG. 1, an important feature of the present invention is the relative vertical location of the major assemblies therein. Specifically, a unique feature of condensing furnace 10 of the present invention is the location of gas control assembly 16 in the upper topmost portion of furnace 10 with primary heat exchanger assembly 18 located below assembly 16; and condensing heat exchanger assembly 18 being connected in fluid communication with and disposed below primary heat exchanger assembly 18, and circulating air blower 24 disposed below condensing heat exchanger assembly 18. Also, disposed below condensing heat exchanger assembly 18 and above circulating air blower 24 is induced draft motor assembly 22. Various advantageous features result from this arrangement of major assemblies of condensing furnace 10, one of which being the counterflow of heating fluid and circulating air to be heated. This results in maximum transfer of heat energy between the heating fluid and the circulating air, and optimizes condensing the water vapor contained in the heating fluid since the cool air to be heated initially is directed upwardly against the heating fluid passing downwardly through condensing heat exchanger assembly 20. Moreover, the inverted burner arrangement, i.e., burners being located in the uppermost portion of furnace 10 rather than at the bottom thereof, simplifies the transfer of heating fluid through the primary and condensing heat exchanger assemblies 18, 20. Since the condensing heat exchanger assembly 20 is below both gas control assembly 16 and primary heat exchanger assembly 18, no additional piping is required to deliver the heating fluid to condensing heat exchanger assembly 20 so as to prevent condensate forming therein from contacting the sensitive portions of gas control assembly 16.

Further advantageous features of condensing furnace 10 of the present invention include the elimination of clogging or fouling of the passages between individual heat exchanger cells 32–36 and 52 due to their spaced apart relationship, and which, with regard to condensing flow passages 64, results in unrestricted drainage of condensate therefrom.

Although the above description has provided four condensing heat exchanger cells 52 for each one of the primary heat exchanger cells 32–36, the present invention contemplates a greater or lower ratio therebetween so as to permit variation of the total heat transfer area to accommodate various ranges of gas input rates. Thus, a multi-cell arrangement of condensing heat exchanger cells 52 can be desirably arranged to satisfy any typical gas input rate for a particular condensing furnace model.

In operation, air is drawn into gas control assembly 16 through combustion air inlet 15 and mixed with fuel gas by burners 26–30 for combustion within primary heat exchanger cells 32–36. The heating fluid created thereby is drawn downwardly by induced draft motor assembly 22 through serpentine primary flow passages 66–70 in heat transfer relation with circulated air urged upwardly by blower 24. The heating fluid exits primary heat exchanger cells 32–36 through their respective outlets 44–48 into transition chamber 50, from which the heating fluid is drawn into condensing heat exchanger cells 52. While the heating fluid is drawn downwardly in a serpentine manner through condensing flow passages 64, it is further cooled by the upwardly circulating air to condensate the water vapor therein to thereby recover sensible and latent heat energy. The heating fluid and condensate are then drawn through outlets 56 into condensate collector 58. From condensate collector 58, the gaseous heating fluid is removed from the condensing furnace 10 by motor assembly 22, and the condensate is drained through condensate drain tube 60 into condensate drain trap 62.

In a typical working embodiment, each inshot burner 26–38 can supply 22,000 BTU for its respective primary heat exchanger cell 32–36. After passing through primary flow passages 66–70, the heating fluid temperature is approximately 500° F.

As the heating fluid is drawn downwardly through condensing flow passages 64, its temperature continues to decrease until the condensing heat exchanger cell temperature reaches about 130° F. At this point, the water vapor in the heating fluid condenses into a liquid upon removal of latent heat therefrom. Thereafter, the heating fluid temperature will decrease to about 110° F. with increasingly larger amounts of condensate being formed.

Depending upon a particular gas input rate for a specific condensing furnace, a desired heat transfer capacity can be effected by providing a selected number of condensing heat exchanger cells 52 in conjunction with a proportional number of primary heat exchanger cells 32-36. This proportion may be in the ratio of 4 to 1, as described above, or may be varied therefrom to satisfy a particular requirement.

While this invention has been described as having a preferred embodiment, it will be understood that it is capable of further modifications. This application is therefore intended to cover any variations, uses, or adaptations of the invention following the general principles thereof, and including such departures from the present disclosure as come within known or customary practice in the art to which the invention pertains and fall within the limits of the appended claims.

What is claimed is:

1. A method of manufacturing a condensing heat exchanger having a high velocity multiple-pass flow passage with an inlet and an outlet from a single flat sheet metal blank, comprising the steps of:

providing a single flat sheet metal blank, designing a prefolded high velocity flow passage pattern with a cross section of alternate planar and convex portions of selected dimensions and shape, forming the designed prefolded high velocity flow passage pattern into a section of the flat sheet metal blank with said planar portion being in the plane of the flat sheet metal blank, folding said formed sheet so that said planar portions abut against similar other planar portions and said concave portions register with similar other concave portions to collectively form the entirety of a high velocity multiple-pass flow passage having an inlet and an outlet, and sealing selected edge portions of the folded sheet.

2. The method of claim 1 wherein the step of designing includes designing the pattern in a serpentine shape, and wherein the step of folding provides the high velocity flow passage with a serpentine shape.

3. The method of claim 1 wherein the step of sealing includes crimping selected edge portions of the folded sheet metal blank.

4. The method of claim 1 wherein the outlet of the high velocity flow passage is seamless by being formed at the fold of the formed sheet to thereby prevent leakage of condensate therefrom.

* * * * *